United States Patent
Bongiovanni et al.

(10) Patent No.: US 7,239,719 B2
(45) Date of Patent: Jul. 3, 2007

(54) AUTOMATIC TARGET DETECTION AND MOTION ANALYSIS FROM IMAGE DATA

(75) Inventors: Kevin Paul Bongiovanni, Portsmouth, RI (US); Paul Patrick Audi, Newport, RI (US); Christopher S. Fortin, Kingstown, RI (US); Kenneth J. McPhillips, Warren, RI (US)

(73) Assignee: BBN Technologies Corp., Cambridge, MA (US)

( * ) Notice: Subject to any disclaimer, the term of this patent is extended or adjusted under 35 U.S.C. 154(b) by 865 days.

(21) Appl. No.: 10/646,537

(22) Filed: Aug. 22, 2003

(65) Prior Publication Data

US 2005/0041102 A1 Feb. 24, 2005

(51) Int. Cl.
*G06K 9/00* (2006.01)
(52) U.S. Cl. .................. 382/103; 382/199; 348/169
(58) Field of Classification Search .................. None
See application file for complete search history.

(56) References Cited

U.S. PATENT DOCUMENTS 6,842,638 B1 * 1/2005 Suri et al. ............... 600/425
2001/0048753 A1 * 12/2001 Lee et al. ................ 382/103

OTHER PUBLICATIONS

Carolyn L. Phillips, The Level-Set Method, MIT Undergraduate Journal of Mathematics, No. 1, Jun. 1999, pp. 155-164.

Nikos Paragios et al., Geodesic Active Regions for Motion Estimation and Tracking, http://www-sop.inria.fr/robotvis/const/ra/00/SuiviLS/, Updated Mar. 8, 1998, 3 pages.

Nikos Paragios et al., Geodesic Active Contours and Level Sets for the Detection and Tracking of Moving Objects, IEEE Trans. On Pattern Analysis and Machine Intelligence, vol. 22, No. 3, Mar. 2000, pp. 266-280.

* cited by examiner

*Primary Examiner*—Bhavesh M Mehta
*Assistant Examiner*—Charles Kim
(74) *Attorney, Agent, or Firm*—Fish & Neave IP Group Ropes & Gray LLP

(57) ABSTRACT

A system and method can detect and track targets in a scene of interest. Interframe differencing can be performed on sequential pairs of images of the scene and a Bayesian model analyzer can obtain an interframe difference density function. The interframe difference density function can be partitioned into static and mobile regimes to provide an objective function. A tracking module can construct a level set and geodesic active contours can be determined for the targets. An adaptive control can apply a spatial transformation and level set perturbation to the geodesic contours to oscillate the contours such that the level set can drop to a lower energy level. The expanded contour can be fed back for use in processing subsequent interframe differences. Target motion analysis data, such as bearing and bearing rate data, can be extracted from the geodesic active contours by applying geometric based transformations on the curve's coordinates.

41 Claims, 2 Drawing Sheets

AUTOMATIC TARGET DETECTION AND MOTION ANALYSIS FROM IMAGE DATA

RELATED APPLICATIONS

There are no related applications.

FIELD OF THE INVENTION

The systems and methods relate to motion detection and analysis, and more particularly to a method and system for automatic target detection and tracking using video data.

BACKGROUND

The acquisition and tracking of targets in an image sequence presents a difficult and challenging image processing problem. To date, numerous approaches for automatic target tracking have been proposed. Many of these algorithms suffer from excessive constraints imposed on the motion of the targets being tracked and the need for an explicit motion model. Such constraints may include requirements for strong intensity boundaries or constraints on the target shape, e.g., the target acquisition may require the target to belong to a parameterized family of shapes.

Motion detection and target tracking can be of critical importance in conducting submarine operations, such as surface operations in high contact density environments, where collision avoidance is critical. Difficulties in detection and tracking can be acerbated by poor situational awareness brought about by the lack of a truly integrated approach in assimilating acoustic and non-acoustic data. Combat control operators may be unable to rapidly process multiple surface contacts while operating at periscope depth, which can compromise own ship safety and jeopardize mission success. The solution to these problems may require improved sensor information management and system automation at several levels.

Present submarine surface operations can require manual extraction and analysis of periscope video data, including numerous separate actions required to process a single periscope report. This processing can result in long time delays in situational assessments, which can increase own ship vulnerability to collision. Thus, the inability to rapidly extract and process tactical information from periscope observations in high contact density environments can compromise ship, and more importantly, crew safety.

Typically, when conducting operations at periscope depth, tactical information on visual contacts can be manually entered into the combat system for further analysis. Although contact bearing can be automatically extracted based on periscope data, it may be manually input into the combat system. Contact range and orientation may be both manually extracted and manually input. Automatic correlation with sonar contacts can be typically performed using simple bearing or bearing-range gating functions. While the traditional approach may be adequate for low contact density, blue water scenarios, for high contact density scenarios, as may be common in littoral environments, this approach can be too operator intensive, especially in poor visibility and close contact spacing. Shallow water operations can constrain own ship depth excursions while high contact density scenarios can constrain own ship course and speed maneuvers. These limitations can require faster reaction times for situational assessment and avoidance of collision.

In order to reduce risks when operating in such environments, successful approaches to target detection and tracking can include addressing boundary constraints in order to operate under visually impaired conditions, e.g., low-light, poor weather, etc. Additionally, the shape constraints can be addressed to avoid a plethora of false detections from common littoral features such as landmasses, bridges and other man-made structures. Further, in high-density contact management (HDCM) problems, a successful algorithm can include automatic handling of target occlusions that can occur when targets pass in front of each other.

SUMMARY OF THE INVENTION

A method, system and computer program for detecting and tracking targets in a scene can perform interframe differencing on sequential pairs of images of the scene. A Bayesian model analyzer can obtain an interframe difference density function, which can be partitioned into static and mobile regimes to provide an objective function. A tracking module can construct a level set and geodesic active contours can be determined for the targets. An adaptive control can apply a spatial transformation to the geodesic contours to oscillate the contours such that the level set can drop to a lower energy level. The expanded contour can be fed back for use in processing subsequent interframe differences. Target motion analysis data, such as bearing and bearing rate data, can be extracted from the geodesic active contours by applying geometric based transformations on the curve's coordinates.

In one embodiment, a method of detecting and tracking targets can include capturing sequential images of a scene; performing motion detection analysis on pairs of the sequential images to detect the targets within the scene; obtaining, for the pairs of the sequential images, the level set contours corresponding with boundaries of the targets within the scene; applying a spatial transformation to the level set contours to expand the level set contours to a lower energy level; performing the motion detection analysis for subsequent pairs of the sequential images using the expanded contours; and extracting time and motion analysis data from the level set contours for the subsequent pairs of sequential images to track the targets within the scene.

Applying the spatial transformation can include determining a percentage of the expanded contours corresponding to the level set contours for the subsequent pairs of sequential images and applying the spatial transformation when the percentage exceeds a predetermined value. The method can also include analyzing one image of each pair of sequential images to obtain static target boundaries and combining the static target boundaries with the target boundaries to obtain the level set contours. An intensity-based diffused edge detection scheme can be applied to analyze the one image.

Extracting time and motion analysis data can include determining object-oriented representations for the level set contours and applying geometric transformations to coordinates of the object-oriented representations. Bearing and bearing rates can be extracted from centroid parameters of the object-oriented representations and range and range rate data can be extracted from curvature characteristics of the object-oriented representations. The curvature characteristics can include length scale, width scale, mean curvature and temporal derivatives thereof.

The level set contours can be obtained by obtaining an objective function and minimizing the objective function. The motion detection analysis can include determining an interframe difference between the sequential images of each pair of sequential images, using a Bayesian model on the interframe difference to obtain an interframe difference density function and providing static and mobile regimes based on the interframe difference density function.

In one embodiment, a method can improve detection and tracking of targets from video image data of a scene, wherein the targets can be detected by performing motion detection analysis on pairs of sequential image data and extracting time and motion analysis data from level set contours for the pairs of sequential image data. The method can include applying a spatial transformation to the level set contours to expand the level set contours to a lower energy level and performing the motion detection analysis for subsequent pairs of the sequential images using the expanded contours.

The spatial transformation can be applied when a percentage of the expanded contours corresponding to the level set contours for the subsequent pairs of sequential images exceeds a predetermined value. The method can include analyzing one image of each pair of sequential images to obtain static target boundaries and combining the static target boundaries with the expanded contours prior to performing the motion detection analysis for subsequent pairs of the sequential images.

In one embodiment, a system for detecting and tracking targets can include an imager to provide sequential images of a scene, a differencer to calculate interframe differences between pairs of the sequential images, a feature boundary detection module to process the interframe differences and to provide motion detection boundaries of the targets within the scene, a level set processor to process the motion detection boundaries to obtain level set contours, an adaptive control to spatially transform the level set contours to a lower energy level to provide expanded contours to the feature boundary detection module for processing interframe differences of subsequent pairs of sequential images and a target motion analyzer to extract time and motion data from the level set contours for the subsequent pairs of sequential images to track the targets within the scene.

The feature boundary detection module can include a Bayesian model analyzer to obtain an interframe difference density function, a regime processor to partition the interframe difference density function into static and mobile regimes and an objective function processor to combine the static and mobile regimes to obtain an objective function representing the motion detection boundaries. The system can include a stationary target detector to provide static target boundaries that can be combined with the static regime. The level set processor can include a gradient descent processor to minimize the objective function. The system can include an output module to present the time and motion data to an operator of the system.

In one embodiment, a computer program, disposed on a computer readable medium, can include instructions for causing a processor to detect and track targets, by capturing sequential images of a scene, performing motion detection analysis on pairs of the sequential images to detect the targets within the scene, obtaining level set contours for the pairs of the sequential images that can correspond with boundaries of the targets within the scene, applying a spatial transformation to the level set contours to expand the level set contours to a lower energy level, performing the motion detection analysis for subsequent pairs of the sequential images using the expanded contours and extracting time and motion analysis data from the level set contours for the subsequent pairs of sequential images to track the targets within the scene.

The instructions to apply the spatial transformation can include instructions for causing the processor to determine a percentage of the expanded contours corresponding to the level set contours for the subsequent pairs of sequential images and to apply the spatial transformation when the percentage exceeds a predetermined value. The computer program can include instructions for causing the processor to analyze one image of each pair of sequential images to obtain static target boundaries and combine the static target boundaries with the target boundaries to obtain the level set contours. The instructions to analyze the one image can include instructions for causing the processor to apply an intensity-based diffused edge detection scheme to the one image.

The instructions to extract time and motion analysis data can include instructions for causing the processor to determine object-oriented representations for the level set contours and apply geometric transformations to coordinates of the object-oriented representations, so as to extract bearing and bearing rates from centroid parameters of the object-oriented representations and to extract range and range rate data from curvature characteristics of the object-oriented representations. The curvature characteristics can include length scale, width scale, mean curvature and temporal derivatives thereof.

The instructions to obtain the level set contours can include instructions for causing the processor to obtain and minimize an objective function. The instructions to perform the motion detection analysis can include instructions for causing the processor to determine an interframe difference between the sequential images of each pair of sequential images, to obtain an interframe difference density function from the interframe difference using a Bayesian model and to provide static and mobile regimes based on the interframe difference density function. The computer program can include instructions for causing the processor to present the time and motion analysis data to an operator.

BRIEF DESCRIPTION OF THE DRAWINGS

The following figures depict certain illustrative embodiments in which like reference numerals refer to like elements. These depicted embodiments are to be understood as illustrative and not as limiting in any way.

DETAILED DESCRIPTION OF THE PREFERRED EMBODIMENTS

Figure 1:
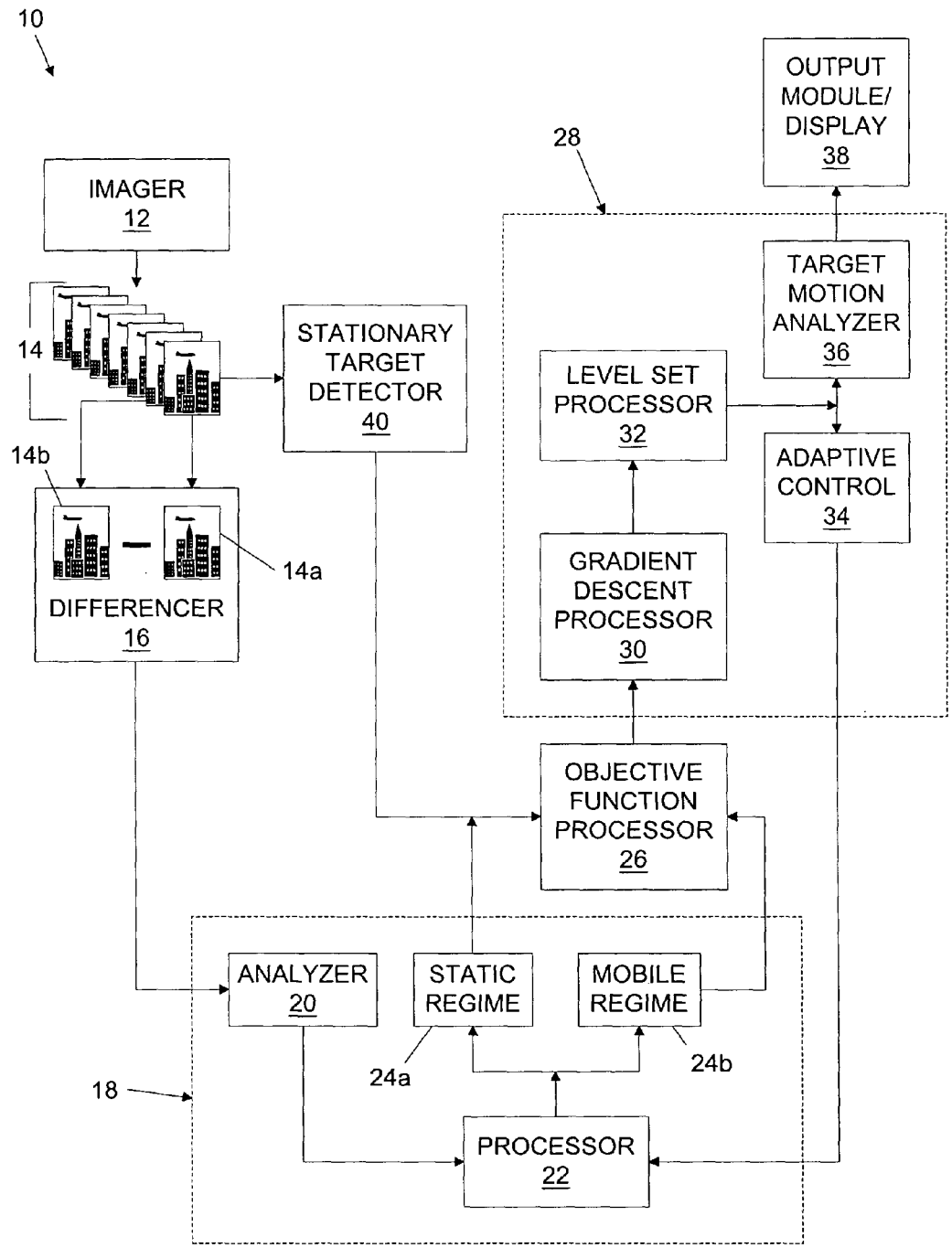
FIG. 1 shows a block diagram of a detection/tracking system.

Referring to FIG. 1, a block diagram of a detection/tracking system 10 is shown. The methodology for the detection/tracking system 10 can be based on a variational framework for detecting and tracking multiple moving targets in image sequences. An imager 12 provides sequential images 14 of a scene in which objects of interest may be located. In one embodiment, the imager 12 can be a video feed. Other means of providing sequential images of the scene can be used, e.g., digital cameras or capturing frames from a television signal.

Differencer 16 can compare sequential pairs of images (e.g., 14a, 14b) and calculates the interframe difference. The interframe difference can be provided to the feature boundary detection module 18, which can use a Bayesian model analyzer 20 to obtain an interframe difference density function. Processor 22 can partition the interframe difference density function into static and mobile regimes, 24a, 24b, which can be provided to objective function processor 26.

Using the static and mobile regimes 24a, 24b, objective function processor 26 can provide an objective function, or energy map, as may be known in the art. This statistical representation can provide the motion detection boundaries for subsequent processing by tracking module 28.

Gradient descent processor 30 of tracking module 28 can apply a gradient descent method, as is known in the art, to minimize the objective function. Level set processor 32 can apply geodesic active contour (GAC) schemes, as are known in the art, to obtain complex, non-rigid contours corresponding to target boundaries that can be detected and tracked. Such GAC schemes can account for topological changes that occur, e.g., when one target occludes another.

In order to address target tracking issues, such as imager 12 self motion and false target tracking, as may occur in some environments, such as the submarine surface operation environment previously described, tracking module 28 can include adaptive control 34. Adaptive control 34 can apply a spatial transformation and level set perturbation to the geodesic contours. Adaptive control 34 can oscillate the contour such that the level set can drop to a lower energy level, resulting in an expanded contour about the target. The expanded contour can be fed back to processor 22 of feature detection module 18 and used in the processing of subsequent interframe differences. In this manner, the expanded contour can increase the robustness of maintaining the boundaries of a moving target, in that the expanded contour may capture the target in sequential frames or images and may thus reduce the amount of processing to provide the motion detection boundaries. New targets that may have appeared can be captured in the manner described previously.

Using object-oriented representations for each contour that has converged on a target, target motion analyzer 36 can extract target motion analysis (TMA) data from the GAC's by applying geometric based transformations on the curve's coordinates, as may be known in the art. For example, bearing and bearing rates can be extracted from the given contour's centroid parameter. Range and range rate can be extracted from contour curvature characteristics, e.g., length scale/width scale, mean curvature and corresponding temporal derivatives. The TMA data can be provided to output module 38 for display, or for otherwise presenting the results to an operator of the system 10.

In addition to motion detection of targets, the system 10 can include detection of stationary targets. Stationary target detector 40 can apply one or more known boundary detection schemes, e.g., intensity-based diffused edge detection, to an image, such as image 14a. The target boundaries determined by stationary target detector 40 can be provided to objective function processor 26, in conjunction with static regime 24a. It can be recognized that, for a single image such as 14a, stationary target detector 40 may detect instances of both stationary and moving targets. Thus, the use of stationary target detector 40 may also increase the robustness of objective function processor 26 by focusing the target boundaries to reduce the amount of processing to provide the motion detection boundaries.

Figure 2:
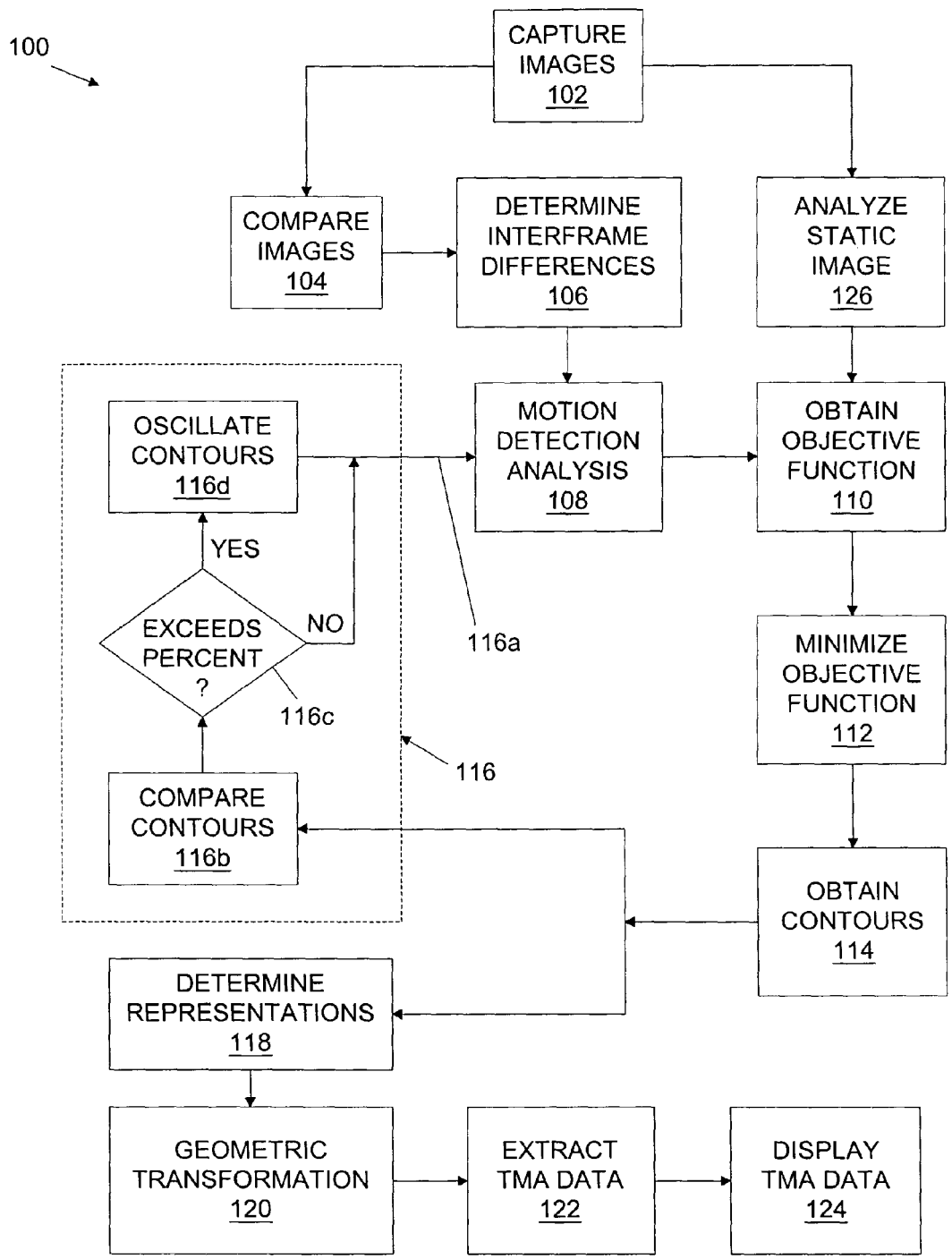
FIG. 2 illustrates a method of implementing target detection and tracking.

Referring now to FIG. 2, there is shown a flow chart for a method 100 of implementing target detection and motion analysis. Sequential images of the scene of interest can be captured 102, as by imager 12. Sequential pairs of images can be compared 104 and interframe differences can be determined 106. Using a Bayesian model, motion detection analysis can be performed 108 on the interframe difference density function to provide the static and mobile regimes 24a, 24b. The objective function is obtained 110 using objective function processor 26. The objective function can be minimized 112 using known gradient descent methods and known level set schemes can be used to obtain contours 114 corresponding to target boundaries.

A spatial transformation and level set perturbation can be applied 116 to the geodesic contours by oscillating the contours such that the level set can drop to a lower energy level. The expanded contour can be fed back, as indicated by arrow 116a, to be used in the processing of subsequent interframe differences at 108. The feed back at 116a can assist in converging the contours on actual targets, while inhibiting false target convergence. As an example, the contour obtained at 114 can be compared 116b to the previously expanded contour to determine a percentage of the previously expanded contour that corresponds with the contour obtained at 114. If the percentage exceeds a predetermined threshold, as determined at 116c, the contour can be oscillated 116d, as described above. The threshold can be varied depending on conditions affecting the images that can be captured, including contact density, visibility, weather conditions and the like.

Object-oriented representations can be determined 118 for the contours obtained at 114 as they converge. Using the object-oriented representations, geometric based transformations can be applied on the contours coordinates 120, and TMA data can be extracted 122. The TMA data can be displayed 124, e.g., to a system operator for additional decision analysis. For the exemplary submarine operations scenario described previously, the TMA data may be used for collision avoidance, and/or for weapons aiming and firing.

The method 100 can also include the static image analysis described with relation to stationary target detector 40. A static image, such as image 14a captured at 102, can be analyzed 126 by applying known boundary detection schemes, e.g., the intensity-based diffused edge detection scheme previously described, to determine target boundaries. The results can be used with the results of the motion detection analysis to obtain the objective function at 110.

The use of adaptive control 34 to apply a spatial transformation and level set perturbation to the geodesic contours at 114, and feeding the expanded contour back to processor 22 at 116 can lead to improved detection and tracking of contacts against cluttered backgrounds and/or under visually impaired conditions. In addition, resolution of multiple, close range, occluded and/or crossing targets can be improved. Improved tracking and decreased processing can provide for less delay in the output of TMA data. For the exemplary submarine operations scenario previously discussed, more rapid access to TMA data can result in improved situational assessment and collision avoidance.

The systems and methods described herein may not be limited to a particular hardware or software configuration; they may find applicability in many environments where tracking of targets is desired. For example, the methods and systems described herein can be used for traffic monitoring, surveillance and/or other motion tracking applications. Additionally, the general structure of the underlying mathematics associated with level set methodologies can enable modification of the detection criteria as additional data sources become available for processing. That is, additional detectable features for automatic processing can be embedded into the objective function without having to modify the algorithm infrastructure. Thus, for example, stationary targets can be detected using infrared (IR) spectral characteristics as a detection criterion.

The techniques may be implemented in hardware or software, or a combination thereof. The systems and methods can be implemented in one or more computer programs executing on one or more programmable computers, such as may be exemplified by the modules and components of FIG. 1, among others, that include a processor, a storage medium readable by the processor (including volatile and non-volatile memory and/or storage elements), one or more input devices, and one or more output devices.

The computer programs, or programs, may be preferably implemented using one or more high level procedural or object-oriented programming languages to communicate with a computer system; however, the program(s) can be implemented in assembly or machine language, if desired. The language can be compiled or interpreted. The computer program(s) can be preferably stored on a storage medium or device (e.g., CD-ROM, hard disk, or magnetic disk) readable by a general or special purpose programmable computer for configuring and operating the computer when the storage medium or device is read by the computer to perform the procedures described herein. The system can also be considered to be implemented as a computer-readable storage medium, configured with a computer program, where the storage medium so configured causes a computer to operate in a specific and predefined manner.

While the method and systems have been disclosed in connection with the preferred embodiments shown and described in detail, various modifications and improvements thereon will become readily apparent to those skilled in the art. As an example, those with ordinary skill in the art will recognize that the arrangement and connectivity of the components shown in the figures are merely for illustrative purposes, and can be varied accordingly and components may be combined or otherwise reconfigured without departing from the scope of the disclosed systems and methods. Accordingly, many additional changes in the details and arrangement of parts, herein described and illustrated, can be made by those skilled in the art. It will thus be understood that the following claims are not to be limited to the embodiments disclosed herein, can include practices otherwise than specifically described, and are to be interpreted as broadly as allowed under the law.

What is claimed is:

1. A method of detecting and tracking targets, comprising:
   capturing sequential images of a scene;
   performing motion detection analysis on pairs of the sequential images to detect targets within the scene;
   obtaining level set contours for the pairs of the sequential images, the level set contours corresponding with target boundaries of the detected targets;
   applying a spatial transformation to the level set contours to expand the level set contours to a lower energy level;
   performing the motion detection analysis for subsequent pairs of the sequential images using the expanded contours; and
   extracting time and motion analysis data from the level set contours for the subsequent pairs of sequential images to track the detected targets.

2. The method of claim 1, comprising:
   analyzing one image of each pair of sequential images to obtain static target boundaries; and
   combining the static target boundaries with the target boundaries to obtain the level set contours.

3. The method of claim 2, wherein analyzing the one image comprises applying an intensity-based diffused edge detection scheme to the one image.

4. The method of claim 1, wherein obtaining level set contours comprises:
   obtaining an objective function; and
   minimizing the objective function.

5. The method of claim 1, wherein performing the motion detection analysis comprises determining an interframe difference between the sequential images of each pair of sequential images.

6. The method of claim 5, comprising:
   using a Bayesian model on the interframe difference to obtain an interframe difference density function; and
   providing static and mobile regimes based on the interframe difference density function.

7. The method of claim 1, wherein applying the spatial transformation comprises:
   determining a percentage of the expanded contours corresponding to the level set contours for the subsequent pairs of sequential images; and
   applying the spatial transformation when the percentage exceeds a predetermined value.

8. The method of claim 7, comprising:
   analyzing one image of each pair of sequential images to obtain static target boundaries; and
   combining the static target boundaries with the target boundaries to obtain the level set contours.

9. The method of claim 8, wherein analyzing the one image comprises applying an intensity-based diffused edge detection scheme to the one image.

10. The method of claim 8, wherein extracting time and motion analysis data comprises:
    determining object-oriented representations for the level set contours; and
    applying geometric transformations to coordinates of the object-oriented representations.

11. The method of claim 10, comprising:
    extracting bearing and bearing rates from centroid parameters of the object-oriented representations; and
    extracting range and range rate data from curvature characteristics of the object-oriented representations.

12. The method of claim 11, wherein the curvature characteristics include length scale, width scale, mean curvature and temporal derivatives thereof.

13. The method of claim 10, wherein obtaining level set contours comprises:
    obtaining an objective function; and
    minimizing the objective function.

14. The method of claim 13, wherein performing the motion detection analysis comprises determining an interframe difference between the sequential images of each pair of sequential images.

15. The method of claim 14, comprising:
    using a Bayesian model on the interframe difference to obtain an interframe difference density function; and
    providing static and mobile regimes based on the interframe difference density function.

16. The method of claim 1, wherein extracting time and motion analysis data comprises:
    determining object-oriented representations for the level set contours; and
    applying geometric transformations to coordinates of the object-oriented representations.

17. The method of claim 16, comprising:
    extracting bearing and bearing rates from centroid parameters of the object-oriented representations; and
    extracting range and range rate data from curvature characteristics of the object-oriented representations.

18. The method of claim 17, wherein the curvature characteristics include length scale, width scale, mean curvature and temporal derivatives thereof.

19. The method of claim 17, comprising presenting the time and motion analysis data to an operator.

20. A system for detecting and tracking targets, comprising:
an imager to provide sequential images of a scene;
a differencer to calculate interframe differences between pairs of the sequential images.
a feature boundary detection module processing the interframe differences to provide motion detection boundaries of the targets within the scene;
a level set processor to process the motion detection boundaries to obtain level set contours;
an adaptive control to spatially transform the level set contours to a lower energy level to provide expanded contours to the feature boundary detection module for processing interframe differences of subsequent pairs of sequential images; and
a target motion analyzer to extract time and motion data from the level set contours for the subsequent pairs of sequential images to track the targets within the scene.

21. The system of claim 20, wherein the feature boundary detection module comprises:
a Bayesian model analyzer to obtain an interframe difference density function;
a regime processor to partition the interframe difference density function into static and mobile regimes; and
an objective function processor to combine the static and mobile regimes to obtain an objective function representing the motion detection boundaries.

22. The system of claim 21, comprising a stationary target detector to provide static target boundaries, the objective function processor combining the static target boundaries with the static regime.

23. The system of claim 22, wherein the level set processor comprises a gradient descent processor to minimize the objective function.

24. The system of claim 23, comprising an output module to present the time and motion data to an operator of the system.

25. The system of claim 21, wherein the level set processor comprises a gradient descent processor to minimize the objective function.

26. The system of claim 20, comprising:
a stationary target detector to provide static target boundaries; and
an objective function processor to combine the static target boundaries with the motion detection boundaries.

27. The system of claim 20, comprising an output module to present the time and motion data to an operator of the system.

28. A method of improving detection and tracking of targets from video image data of a scene, wherein the targets are detected by performing motion detection analysis on pairs of sequential image data and extracting time and motion analysis data from level set contours for the pairs of sequential image data, the method comprising:
applying a spatial transformation to the level set contours to expand the level set contours to a lower energy level; and
performing the motion detection analysis for subsequent pairs of the sequential images using the expanded contours.

29. The method of claim 28, wherein applying the spatial transformation comprises:
determining a percentage of the expanded contours corresponding to the level set contours for the subsequent pairs of sequential images; and
applying the spatial transformation when the percentage exceeds a predetermined value.

30. The method of claim 28, comprising:
analyzing one image of each pair of sequential images to obtain static target boundaries; and
combining the static target boundaries with the expanded contours prior to performing the motion detection analysis for subsequent pairs of the sequential images.

31. A computer program, disposed on a computer readable medium, for providing detection and tracking of targets, the computer program including instructions for causing a processor to:
capture sequential images of a scene;
perform motion detection analysis on pairs of the sequential images to detect the targets within the scene;
obtain level set contours for the pairs of the sequential images, the level set contours corresponding with boundaries of the targets within the scene;
apply a spatial transformation to the level set contours to expand the level set contours to a lower energy level;
perform the motion detection analysis for subsequent pairs of the sequential images using the expanded contours; and
extract time and motion analysis data from the level set contours for the subsequent pairs of sequential images to track the targets within the scene.

32. The computer program of claim 31, wherein the instructions to apply the spatial transformation include instructions for causing the processor to:
determine a percentage of the expanded contours corresponding to the level set contours for the subsequent pairs of sequential images; and
apply the spatial transformation when the percentage exceeds a predetermined value.

33. The computer program of claim 32, including instructions for causing the processor to:
analyze one image of each pair of sequential images to obtain static target boundaries; and
combine the static target boundaries with the target boundaries to obtain the level set contours.

34. The computer program of claim 33, wherein the instructions to analyze the one image include instructions for causing the processor to apply an intensity-based diffused edge detection scheme to the one image.

35. The computer program of claim 33, wherein the instructions to extract time and motion analysis data include instructions for causing the processor to:
determine object-oriented representations for the level set contours; and
apply geometric transformations to coordinates of the object-oriented representations.

36. The computer program of claim 35, including instructions for causing the processor to:
extract bearing and bearing rates from centroid parameters of the object-oriented representations; and
extract range and range rate data from curvature characteristics of the object-oriented representations.

37. The computer program of claim 36, wherein the curvature characteristics include length scale, width scale, mean curvature and temporal derivatives thereof.

38. The computer program of claim 35, wherein the instructions to obtain level set contours include instructions for causing the processor to:

obtain an objective function; and minimize the objective function.

39. The computer program of claim 38, wherein the instructions to perform the motion detection analysis include instructions for causing the processor to determine an interframe difference between the sequential images of each pair of sequential images.

40. The computer program of claim 39, including instructions for causing the processor to:

obtain an interframe difference density function from the interframe difference using a Bayesian model; and provide static and mobile regimes based on the interframe difference density function.

41. The computer program of claim 39, including instructions for causing the processor to present the time and motion analysis data to an operator.

* * * * *